United States Patent
Bina et al.

(10) Patent No.: US 7,334,945 B2
(45) Date of Patent: Feb. 26, 2008

(54) PLUG-AND-SOCKET HUB ARRANGEMENT FOR MOUNTING LIGHT PIPE TO RECEIVE LIGHT

(75) Inventors: Dave Bina, Northfield Center, OH (US); Roger F. Buelow, II, Gates Mills, OH (US); Gregory P. Frankiewicz, Mayfield Heights, OH (US)

(73) Assignee: Energy Focus, Inc., Solon, OH (US)

( * ) Notice: Subject to any disclaimer, the term of this patent is extended or adjusted under 35 U.S.C. 154(b) by 175 days.

(21) Appl. No.: 10/825,985

(22) Filed: Apr. 16, 2004

(65) Prior Publication Data

US 2004/0240231 A1 Dec. 2, 2004

Related U.S. Application Data

(60) Provisional application No. 60/473,822, filed on May 28, 2003.

(51) Int. Cl.
*G02B 6/36* (2006.01)
*H01H 23/00* (2006.01)

(52) U.S. Cl. ............... 385/88; 385/89; 385/147; 362/581

(58) Field of Classification Search ............... 385/31, 385/50, 52, 88–94, 134, 147; 362/551, 581, 362/582
See application file for complete search history.

(56) References Cited

U.S. PATENT DOCUMENTS 5,923,805 A * 7/1999 Anderson et al. ............. 385/86
6,304,693 B1 10/2001 Buelow, II et al.
6,854,897 B2 * 2/2005 Furumai et al. ............... 385/73

OTHER PUBLICATIONS

GE Plastics, dated Mar. 27, 2001, two pages, accessed on Jun. 22, 2004 from the following webpage:http://www.geplastics.com/servlet/xslt/UDefaultApplyXSL?URL=/resins/news/press/01_03_27.xml?xsIURL=/.

Tyco Electronics, "Product Catalog, Sealed Connectors a Superseal 1.5 Series, AMP 282079-2, Product Photo", p. 1/1, accessed Jul. 7, 2004 from the following webpage: http://catalog.tycoelectronics.com/TE/common/images/PartImages/06o8018a.jpg.

Tyco Electronics, "Product Catalog, Sealed Connectors, Superseal 1.5 Series, AMP 282079-2, Product Documentation, Customer Drawing", p. 1/2-2/2, accessed Jul. 7, 2004 from:http://ecommas.tycoelectronics.com/commerce/DocumentDelivery/BINOCULR1.gif.

* cited by examiner

*Primary Examiner*—Kevin S. Wood
(74) *Attorney, Agent, or Firm*—Charles E. Bruzga; Bruzga & Associates

(57) ABSTRACT

A hub arrangement for mounting light pipe to receive light includes a light pipe hub for mounting at least one light pipe, with a plug-and-socket arrangement. The plug-and-socket arrangement includes (i) a socket in the light pipe hub for receiving a plug, and (ii) a plug for mounting a light pipe end that is to receive light. A fore end of the plug is receivable within the socket. The plug has a channel for receiving the light pipe through an aft end of the plug. The hub arrangement may also include, if desired, a rod hub for mounting at least one thermally isolating, light-collection rod for receiving light from a light source. The hub arrangement allows easy and rapid coupling of light pipe to an illumination source, using a "plug-and-socket" feature. The hub arrangement may incorporate several safety features to prevent premature light pipe failure.

32 Claims, 18 Drawing Sheets

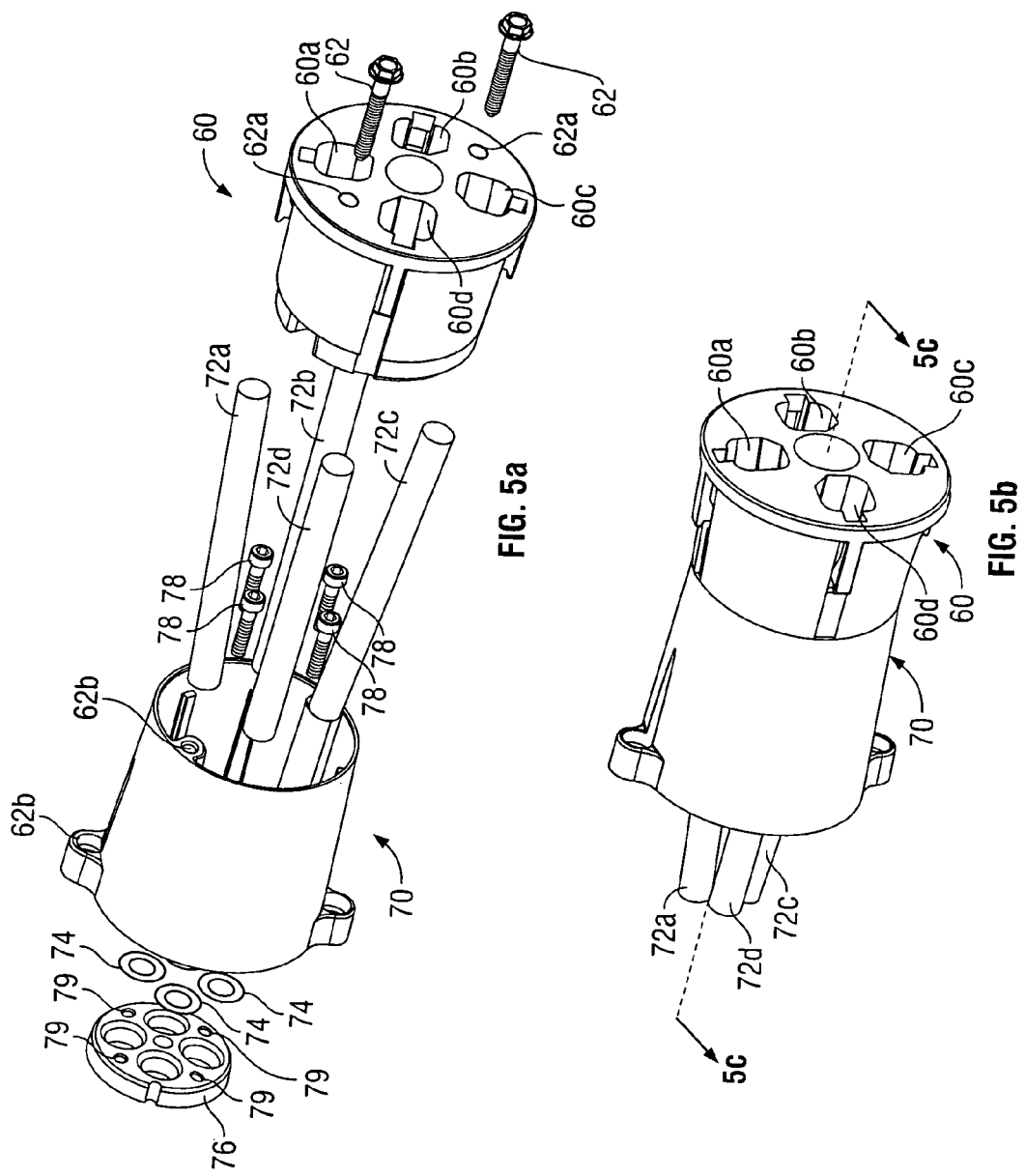

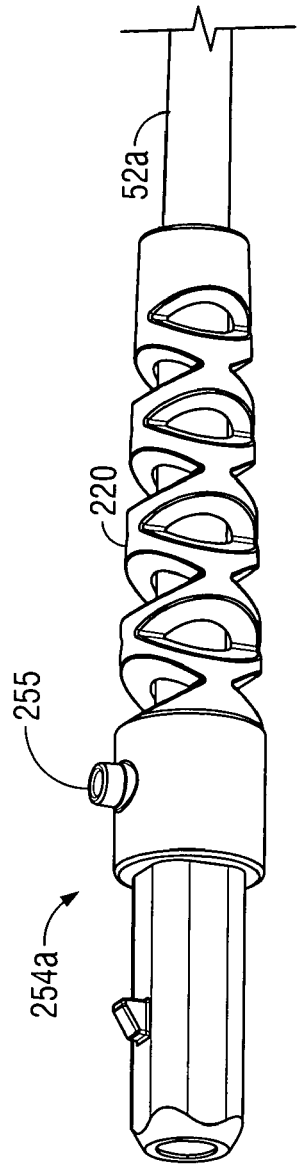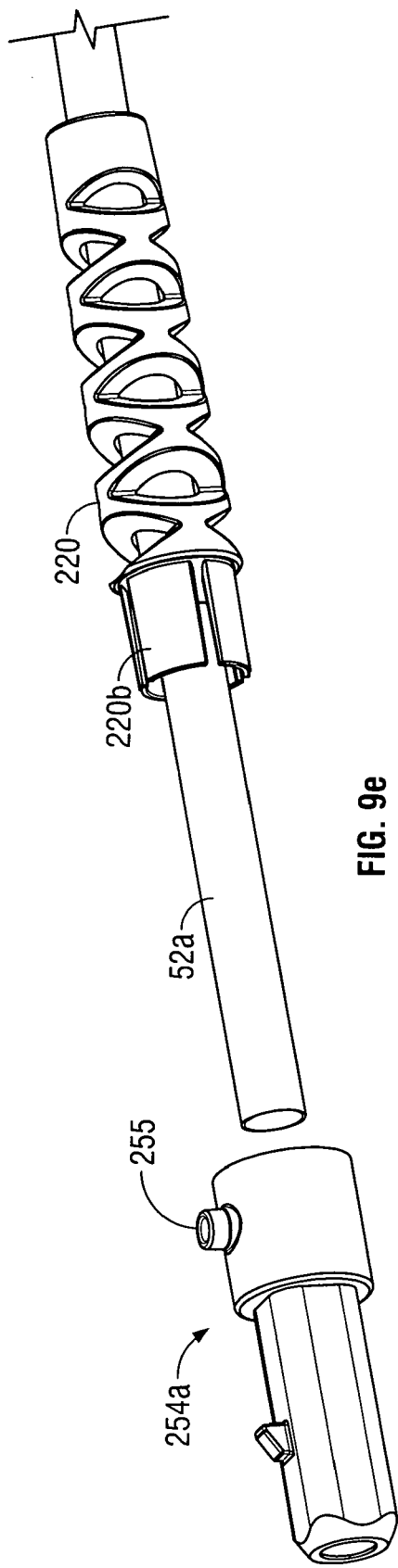
FIG. 9d
FIG. 9e

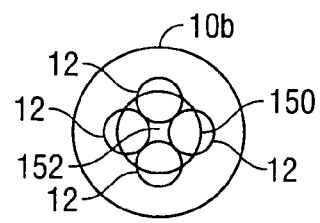
FIG. 11
(Prior Art)
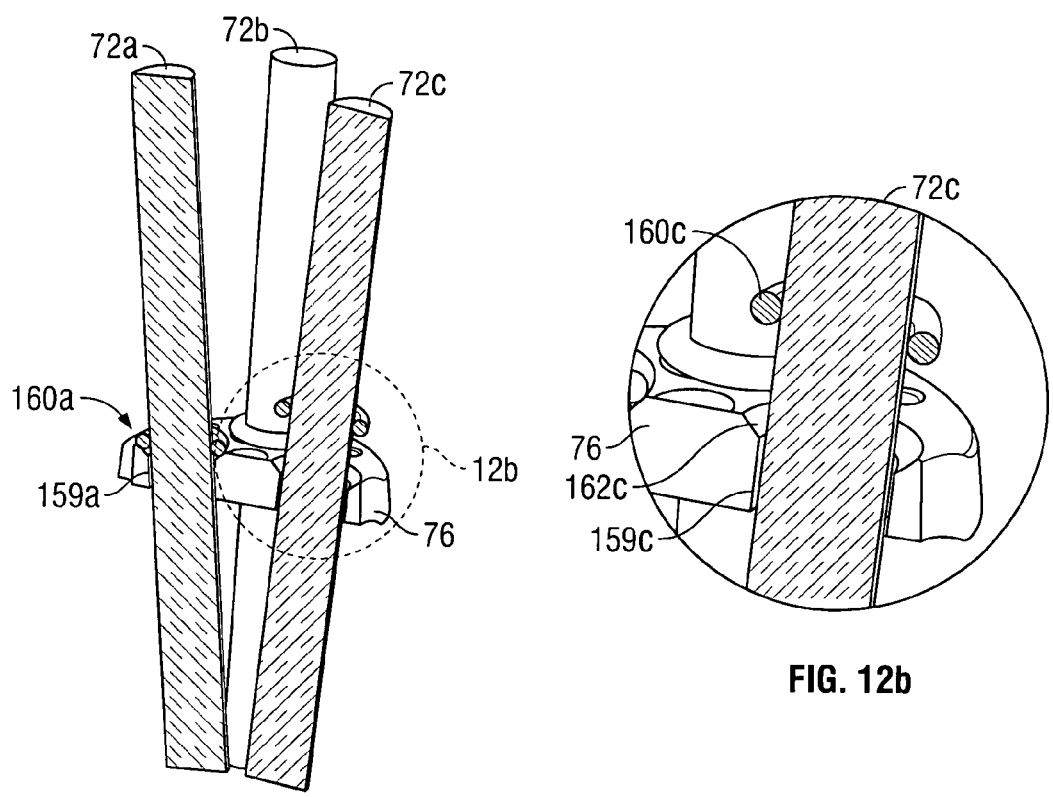
FIG. 12a
FIG. 12b

PLUG-AND-SOCKET HUB ARRANGEMENT FOR MOUNTING LIGHT PIPE TO RECEIVE LIGHT

This application claims priority from U.S. Provisional Patent Application No. 60/473,822 filed on May 28, 2003.

FIELD OF THE INVENTION

The present invention relates to arrangements for mounting light pipe to receive light. More particularly, it relates to arrangements including a plug-and-socket feature for mounting light pipe for receiving light, in which the light pipe is mounted in a plug that is received into a socket in a light pipe hub.

BACKGROUND OF THE INVENTION

There are many issues involved in coupling plastic optical fiber, or light pipe, to a light source. The light pipe must be held in such a way so as to prevent mechanical damage. Mechanical damage to the light pipe could result in significant light loss and increased light pipe temperature.

Because the light pipe is made of plastic, the operating temperature of the light pipe must be held as low as possible to prevent premature failure of the light pipe. By ensuring that the coupling method thermally isolates the plastic light pipe from the light source, the light pipe temperature will not be unnecessarily increased. It would also be desirable to minimize the amount of light impinging on the coupling means to prevent increasing the temperature of the environment.

One prior art approach bundles together light pipes when coupling to a source of light. A bundle of multiple light pipes together can be unwieldy and difficult to handle. Also, if one light pipe needs to be removed they all do. It would thus be preferable if each light pipe can be easily installed individually. Preferably, each light pipe can be also easily removed from the light source.

SUMMARY OF THE INVENTION

A preferred embodiment of the invention provides a hub arrangement for mounting light pipe to receive light. The arrangement includes a light pipe hub for mounting at least one light pipe, with a plug-and-socket arrangement. The plug-and-socket arrangement includes (i) a socket in the light pipe hub for receiving a plug, and (ii) a plug for mounting a light pipe end that is to receive light. A fore end of the plug is receivable within the socket. The plug has a channel for receiving the light pipe through an aft end of the plug.

The hub arrangement may also include, if desired, a rod hub for mounting at least one thermally isolating, light-collection rod for receiving light from a light source.

The foregoing hub arrangement allows easy and rapid coupling of light pipe to an illumination source, using a "plug-and-socket" feature. The hub arrangement may incorporate several safety features to prevent premature light pipe failure.

For convenience in understanding the various directions concerning orientation to a light source, this specification refers to "fore" and "aft" in the following manner. A "fore" view, or "fore" side, of a light pipe, etc., is that part of the light pipe, etc., closest to the light source. An "aft" view, or "aft" side, of a light pipe, etc., refers to that part of the light pipe, etc., furthest away from the light source.

BRIEF DESCRIPTION OF THE DRAWINGS

In the drawings, in which like reference numerals refer to like parts:

FIG. 1b is a fore view of the light pipe hub of FIG. 1a.

FIG. 3b is a fore perspective view of the light pipe hub of FIG. 3a; and FIG. 3c is an aft perspective view of a hub for light-collection rods of FIG. 3a.

FIG. 5a is an exploded, aft perspective view of the hub arrangement of FIG. 4; FIG. 5b is an aft perspective view of the hub arrangement of FIG. 4.

FIG. 6e is a fore perspective view, in exploded form, of the light pipe and plug of FIG. 6a.

FIG. 7b is a top perspective view of an adapter that may fit into the aft end of the plug of FIG. 7a.

FIG. 9d is similar to 9a, but shows, among other things, a metal plug instead of a plastic plug; and FIG. 9e is an exploded view of FIG. 9d.

FIG. 11 is a simplified schematic showing the juxtaposition of four light pipes onto a single light-collection rod according to the prior art.

FIG. 12a is a side perspective view, partially in cross section, of light-collecting rods of FIG. 4 positioned in a backer plate of a rod hub with the aid of O-rings; and FIG. 12b is an enlargement of the circled portion of FIG. 12a marked 12b.

FIG. 13b is a cross section taken at Arrows 13b-13b in FIG. 13a.

FIG. 13c is a top perspective view of the various parts of the rod hub of FIG. 4 placed in assembly jig of FIG. 13a.

FIG. 15b is a cross sectional view of FIG. 15a taken at Arrows 15b-15b in FIG. 15a.

DETAILED DESCRIPTION OF THE INVENTION

To put the invention in perspective, this description first considers three arrangements for mounting light pipe to receive light, the first two being prior art and the third being a prototype of the present invention by the present inventors.

Context of the Invention

Figure 1A:
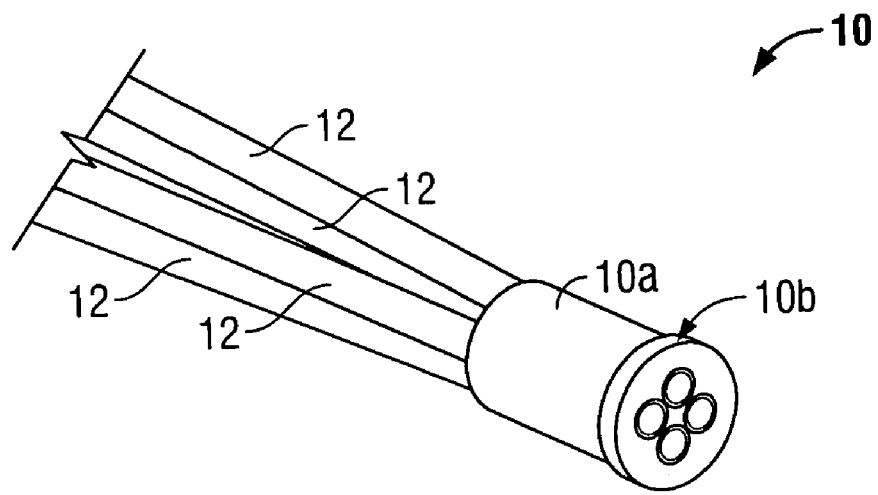
FIG. 1a is a side, perspective view of a prior art light pipe hub for mounting four light pipes.
Figure 1B:
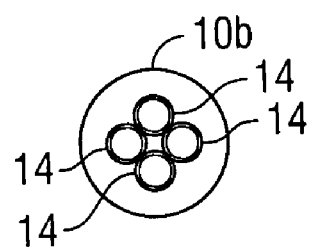

FIGS. 1a and 1b show a first prior art light pipe hub 10 for mounting four large-core plastic optical light pipes 12 together to couple to a single rod (not shown). Light pipe hub 10 includes a cylindrical section 10a for holding the four light pipes tangent to each other and an end cap 10b. Both cylindrical section 10a and end cap 10b are made of metal. Light pipes 12 are inserted into predrilled holes 14 within the light pipe hub, so as to hold the light pipe faces in fixed relation to each other, with minimal light loss due to the packing fraction, or spaces, between light pipe ends. Potting material is poured into the cylindrical back end 10a of the hub to hold the light pipes in place.

Various difficulties arise with the use of a metal light pipe hub and potting material as in FIG. 1a. First, it is difficult to pot the light pipes into the cylindrical section 10. Typical potting material is thermally conductive, making it expensive, viscous, difficult to work with, and slow curing. Any light pipe 12 that is out of round does not fill its associated, predrilled hole 14 in hub 10, which allows potting material to flow out the end cap 10b. This can damage the bundle of light pipes 12 beyond repair. To prevent this, a cyano-acrylate-based, such as KRAZY GLUE adhesive made by Elmers Products Inc. of Columbus, Ohio can be used to bond the ends of the light pipes shown in FIG. 1b to end cap 10b, but the bond between the metal and light pipe is inferior to thermally conductive epoxy. Because light impinges on the interstitial spaces between the light pipes, the bundle is heated unnecessarily. Further, the resulting bundle of light pipes is difficult to install with each light pipe being connected to the other. This can make routing the individual light pipes a somewhat tedious process. Finally, if one light pipe is damaged, then the entire bundle is rendered unusable.

Figure 2:
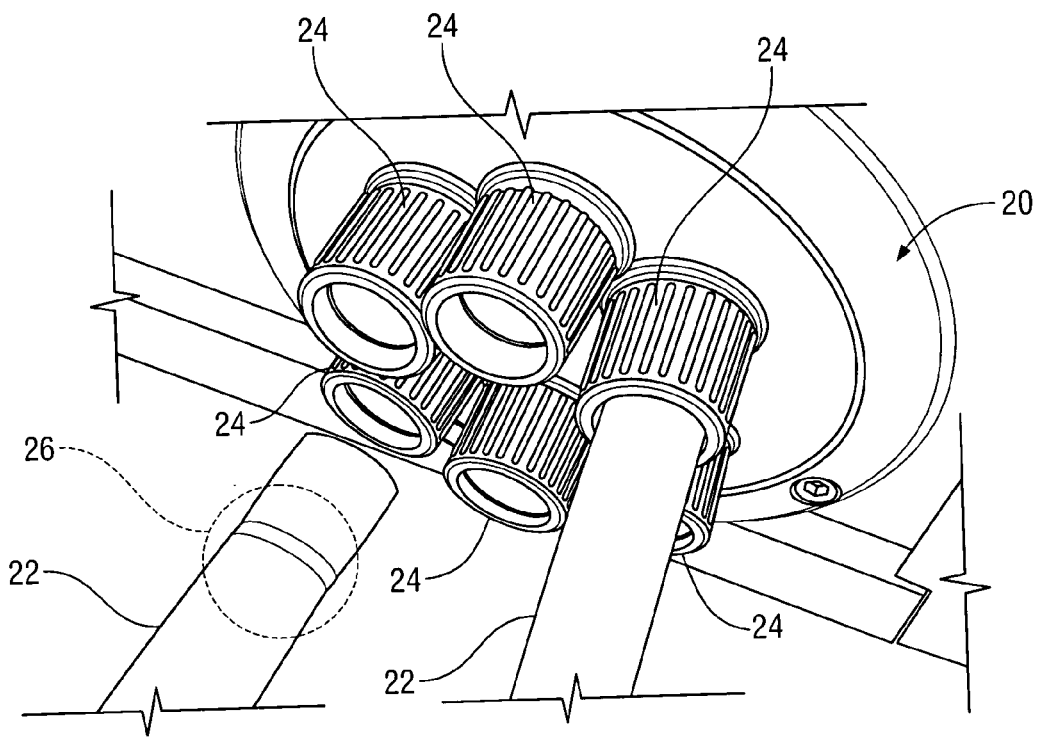
FIG. 2 is an aft perspective view of second prior art light pipe hub for mounting light pipe, which uses compression nuts for holding the pipes, with one light pipe removed for clarity of illustration.

FIG. 2 shows another prior art light pipe hub 20, in which six large-core light pipes can be held in place in the hub by compression nuts 24. As seen in the circled region labeled 26, a light pipe 22 shows damage due to an associated compression nut 24 compressing the sheathing of the light pipe. Such compression on large-core plastic optical light pipe causes a loss of light that can overheat the light pipe. Such compression also results in an area of high pressure on the light pipe, which makes kinking of the light pipe much more likely. Kinking of the light pipe results in a dramatic loss in light output and could lead to premature failure. Crimping on the light pipe should be avoided if possible, so potting as in FIGS. 1a and 1b has often been used instead of compression nuts.

Figure 3A:
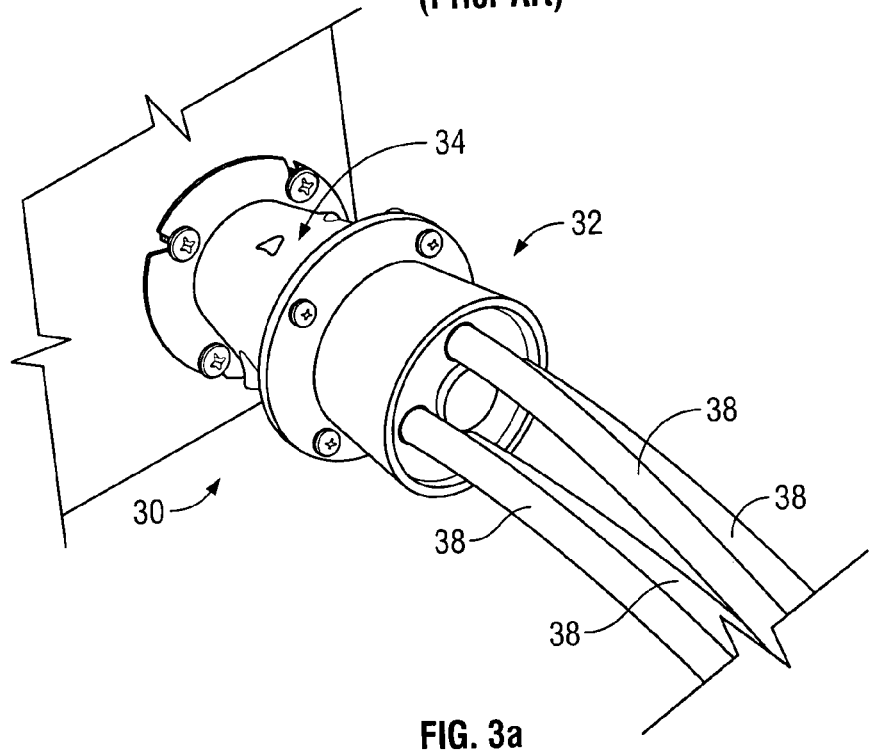
FIG. 3a is an aft perspective view of a prototype hub assembly for mounting four light pipes and four light-collection rods, which was created by the present inventors.
Figure 3B:
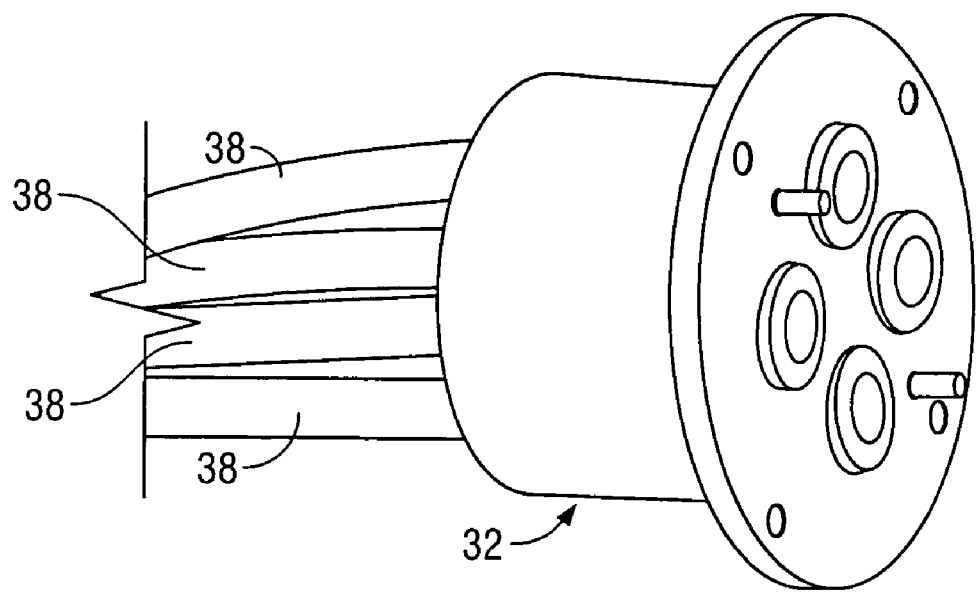
Figure 3C:
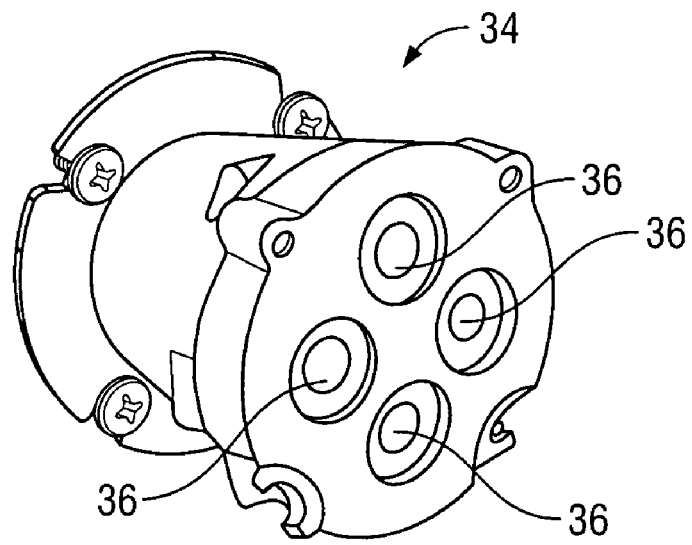

FIGS. 3a-3c show a prototype hub assembly 30 including light pipe hub 32 and a hub 34 for light-collection rods 36. Light pipe hub 32 mounts four light pipes 38, and rod hub 34 mounts four associated rods 36. Light pipe hub 32 is made of metal and holds the light pipes in place with potting material, as in the prior art hub 10 of FIGS. 1a-1b. The above-described difficulties associated with using a metal light pipe hub and potted bundle of light pipes of FIGS. 1a-1b also apply to the hub arrangement of FIG. 3a. However, the spacing between rods 36 shown in FIG. 3c allows a unique opportunity to mount each light pipe separately as done in the inventive hub arrangements now described.

Hub Arrangement of the Invention

Figure 4:
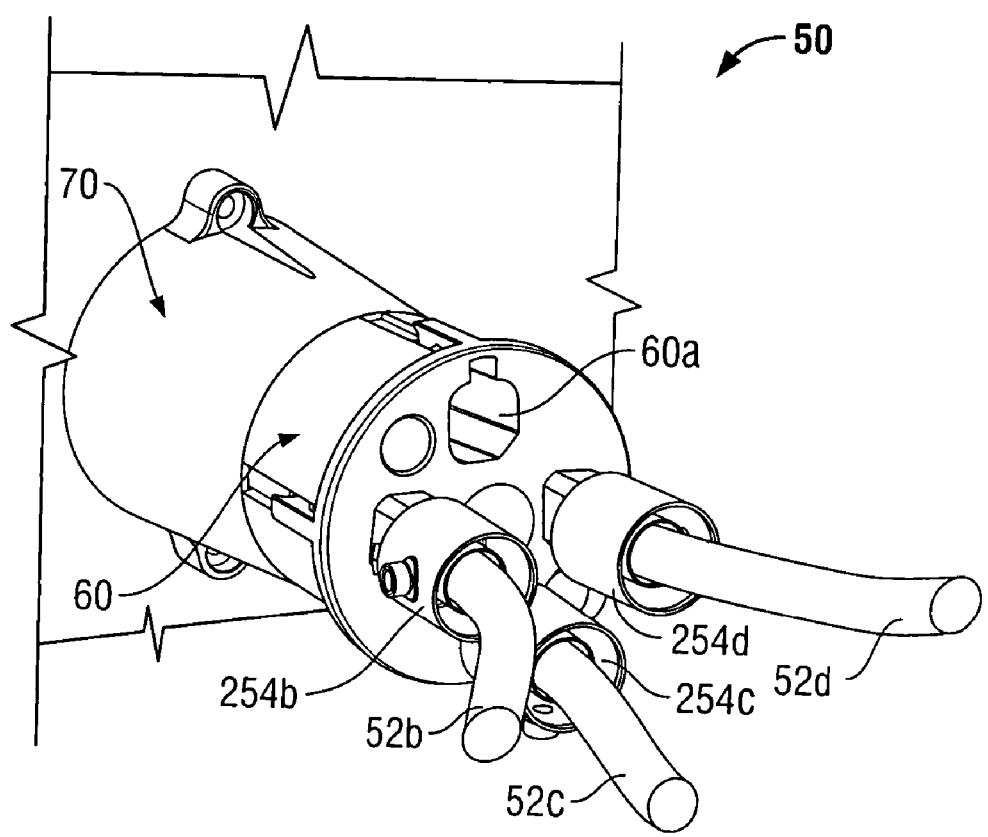
FIG. 4 is an aft perspective view of an inventive hub arrangement for mounting four light pipes to receive light from four respective light-collection rods, with one of the light pipes removed, and one being partially inserted into the hub assembly.

FIG. 4 is a perspective view of a hub assembly 50, including a light pipe hub 60 and a rod hub 70, that avoids the mentioned difficulties associated with a metal light pipe hub and potting of the light pipes. Hub assembly 50 mounts four light pipes, but only light pipes 52b and 52c are shown mounted in the assembly, light pipe 52d is shown partially inserted into the assembly via a plug 54d, and a fourth light pipe (52a) is not shown which is normally received in a socket 60a in light pipe hub 60. The light pipes may be optimized for end light emission, side light emission, or both.

Although four light pipes are intended for hub assembly 50 (FIG. 4), a light pipe hub of the invention can mount two, three, five, or six light pipes, for instance, or more.

In hub assembly 50 (FIG. 4), a plug (e.g., 54b, 54c or 54d) receives the end of an associated light pipe. The light pipes (e.g., 52b, 52c and 52d) may be glued into their associated plugs with the aid of a cyano-acrylate based glue. Referring to both FIGS. 4a and 5a-5c, four light-collection rods 72a-72d, of refractory material such as quartz or BK7 glass, may be held in place through the use of rod hub 70 with O-rings 74 and a backer plate 76 mounted to rod hub 70 with cooperating screws 78 and threaded apertures 79 in backer plate 76, for instance. Light pipe hub 60 contains sockets 60a-60d that accept plugs (e.g., 54b-54d, FIG. 4) into which light pipes (e.g., 52b-52d, FIG. 4) are mounted. Hub 60 may be held to hub 70 with screws 62 that pass through apertures 62a in hub 60 are threadedly received in threaded holes 62b in hub 70. Each light pipe-plug assembly is simply plugged into an associated socket in light pipe hub 60 to complete mounting of the light pipes for receiving light.

Hub arrangement 60 of FIGS. 4 and 5a-5c preferably includes rod hub 70 for receiving light from a non-imaging light source such as shown in U.S. Pat. No. 6,304,693, assigned to the instant assignee. However, a hub arrangement according to the invention could omit a rod hub when collecting light from an imaging-type light source using parabolic reflectors, for instance. This is because the added space along the optical axis makes it unnecessary to use refractory light-collection rods for thermally isolating the heat-sensitive plastic light pipes from a nearby high temperature light source.

Typical light sources (not shown) generating the light collected by hub arrangement 60 of FIGS. 4 and 5a-5c include metal halide lamps, halogen lamps, incandescent lamps, a light-emitting diode (LED) or diodes (LEDs), or any type of light source with a bulbous region (or section) from which light emanates.

Features of the Plug

FIGS. 6a-9f show various features of the plugs of the invention.

Figure 5C:
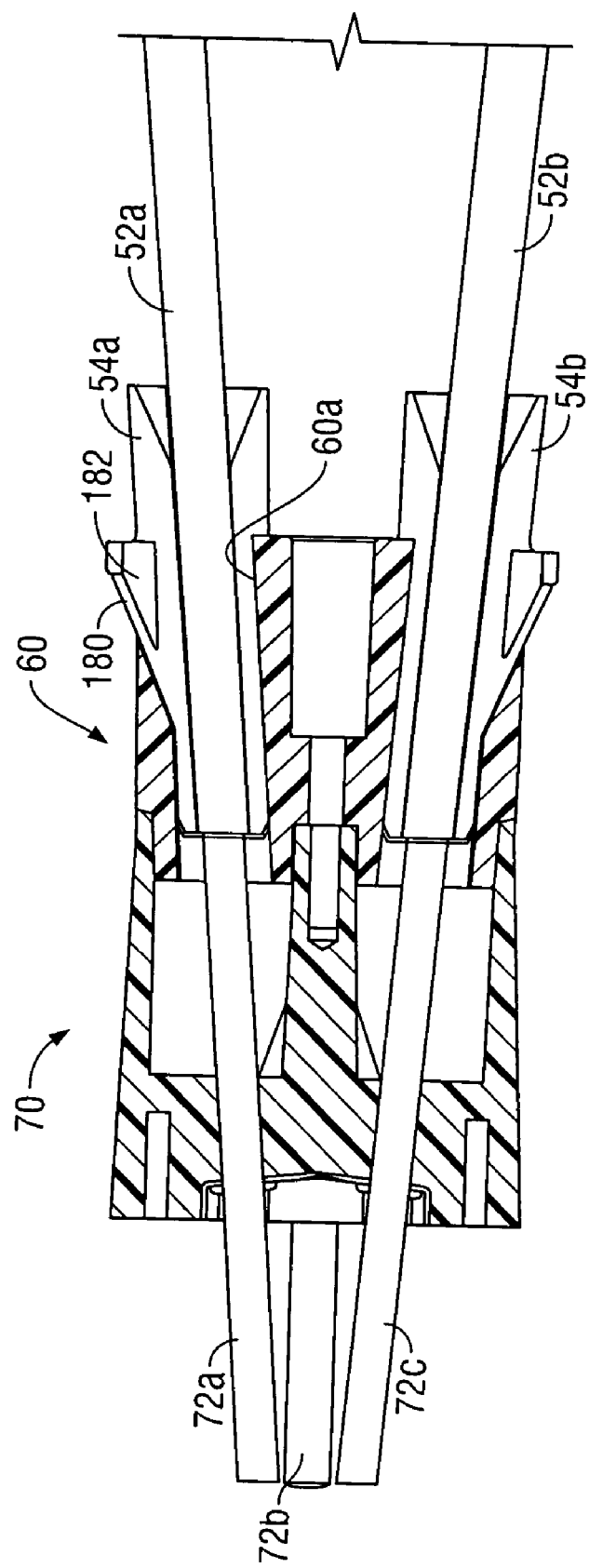
FIG. 5c is a side view, partially in cross-section, of the hub arrangement of FIG. 5a in assembled form, taken in the direction of Arrows 5c-5c in FIG. 5b.
Figure 6A:
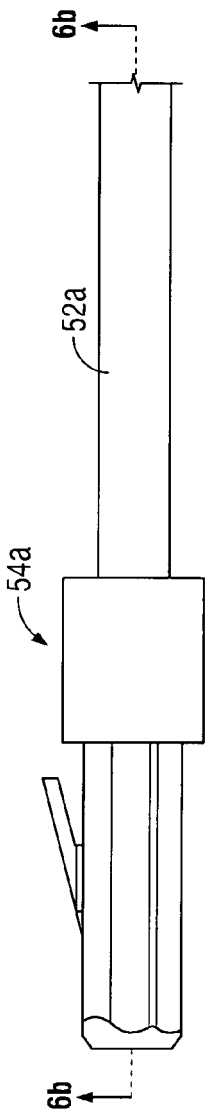
FIG. 6a is a side view of a plug used in the inventive arrangement of FIGS. 4 and 5a-5c.
Figure 6B:
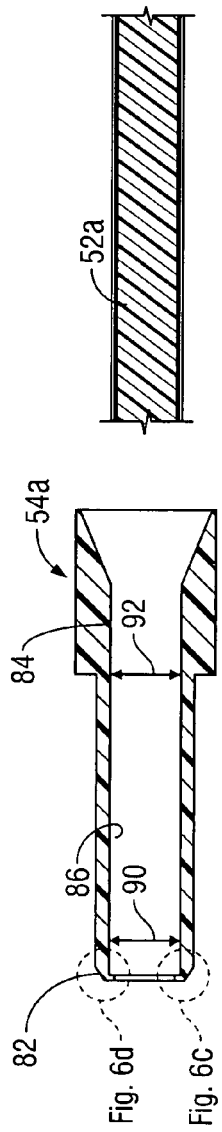
FIG. 6b is a sectional view taken at Arrows 6b-6b in FIG. 6a, with part of the light pipe removed.

FIGS. 6a-6e show features of mounting a light pipe 52a into a plug 54a, for use in the inventive arrangement of FIGS. 4 and 5a-5c. As shown in FIG. 6b, plug 54a has an interior channel 86 for receiving a fore end of light-pipe 52a. Channel 86 preferably has an increasing diameter from its fore end 82 to its aft end 84, so that diameter 90 is less than diameter 92. Preferably, the increasing diameter of channel 86 defines a taper of about a 1 degree. Such taper has various purposes: (1) It aids in the ejection of the final molded plug from a fabrication mold. (2) It aids in guiding an out-of-round light pipe into place within the plug by having a larger channel diameter at the aft end of the plug, which tapers down to the final size at the fore end of the plug. (3) The taper further aids in causing a slight compression on the light pipe, which helps to create a seal to prevent any glue used for mounting from flowing out the fore end of the plug when gluing the light pipe into the plug. (4) Additionally, the resulting compression on the light pipe also aids in preventing a light-transmitting core (not shown) of the light pipe from slipping within the usually slippery fluoropolymer cladding (not shown) on a large-core light pipe. The taper can be increased to improve all of these features in concert with one another.

Preferably, glues for adhering a light pipe into a plug, if a glue is desired, include epoxy and also cyano-acrylate based glue, under the brand name KRAZY GLUE mentioned above, for instance. Use of a cyano-acrylate based glue avoids many of the above-mentioned problems associated with the use of a metal light pipe hub and potting material on the light pipe ends. Cyano-acrylate glue is inexpensive, only a few drops are usually needed, and it cures quickly. If a light pipe is out of round, such glue can still easily glue a light pipe into a plug. As long as some amount of the light pipe's outer diameter is in contact with the plug's inner, channel diameter, then cyano-acrylate based glue will bond the adjacent surfaces of the light pipe and plug together through capillary action. Because of the small amount of glue necessary to adhere a light pipe within a plug, it is less likely that glue will flow out the fore face of the plug and damage the light pipe.

In any event, owing to the individual mounting of light pipes in a light pipe hub according to the invention, if glue should flow out the fore face of a plug and damage the associated light pipe, only that light pipe needs to be replaced. In this regard, if any light pipe is damaged in any way, only that light pipe needs to be replaced. Additionally, since only a single light pipe is mounted to the light pipe hub at a time, routing the light pipe in an application is easy.

Figure 6C:
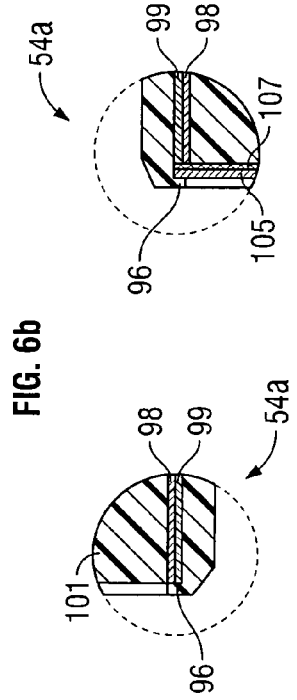
FIG. 6c is an enlargement of the circled portion in FIG. 6b labeled FIG. 6c.

FIG. 6c shows details of the fore end of plug 54a, including a lip 96 at the fore face of the plug. Lip 96 has at least several purposes. First, it holds the light pipe while stopping any fluoropolymer cladding 98 on a core 101 of the light pipe and any jacket 99 of polymer, for instance, without blocking light transmission through the core. Second, the lip holds the light pipe fore face at the proper axial location within the plug. This is important because, if the light pipe fore face is too far forward, it can come into contact with a light-collection rod (e.g., 72a-72d, FIG. 5a) and adhere itself—known as "wetting"—to the rod. With the light pipe essentially fused to the rod, removing a light pipe will at least damage the light pipe input face, and at worst completely rip out a section of the core out so as to render the light pipe unusable. If the light pipe is wetted well enough, the rod could be pulled out of the rod hub.

Figure 6D:
FIG. 6d is a alternative version of an enlargement of the circled portion of FIG. 6b labeled FIG. 6d.
Figure 6E:
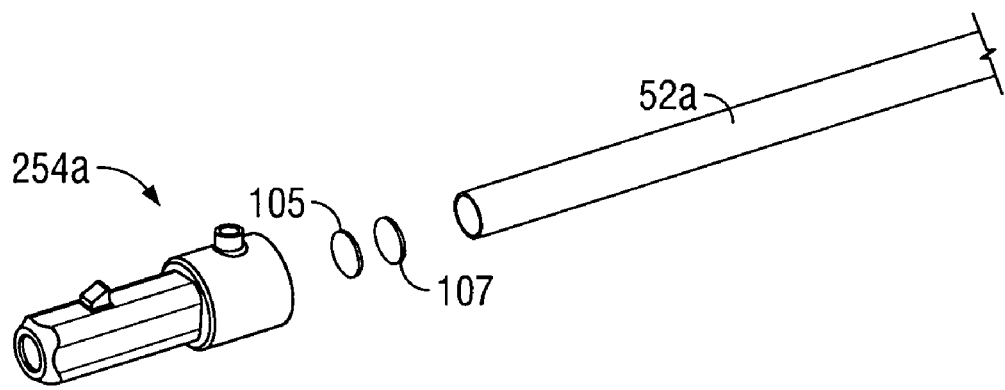

FIGS. 6d and 6e show the provision of an optical filter or filters 105 at the fore face of light pipe 52a, which are held by glue 107, for instance, onto the light pipe. Filter(s) 105 can, by way of example, include an anti-reflective (AR) coating to help reduce optical losses associated with Fresnel reflections, and/or an ultraviolet (UV) filter to protect the plastic light pipe from UV radiation. A filter to impart color to the light can also be used. Filter(s) 105 can be held onto the light pipe face with a gluing means 107, if desired. When an optical filter(s) 105 is used, lip 96 (FIG. 6d) helps center and hold the filter in correct alignment with the light pipe face. The lip also places the filter in the correct axial location with respect to a light-collection rod (e.g., 72a-72d, FIG. 5a), which is typically made of quartz or some other refractory material. In the absence of such lip, if a filter on a light pipe comes into contact with a rod made of quartz, for instance, the interface between the filter, when made of a polymer, for instance, becomes a quartz-polymer interface and the filter may lose some, or all, of its effectiveness. By properly positioning the filter with respect to a light-collection rod (e.g., 72a-72d, FIG. 5a), the lip further prevents the above-described problems associated with wetting of a rod to the end face of a light pipe—but in this case the problems would concern wetting of a rod to a filter.

Figure 6F:
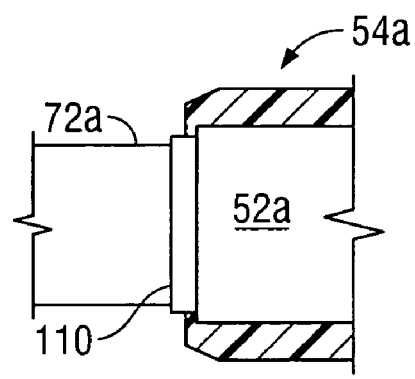
FIG. 6f is a fragmentary side view, partially in cross section, of a light pipe extending through a plug and an adjacent light-collection rod.

Additionally, in an application where ultimate optical efficiency is required, lip 96 (FIGS. 6c and 6d) can be removed. This allows the light pipe face to be positioned flush with the plug fore face or even extend beyond it. In such positions, the light pipe face can purposely contact with and wet to a light-collection rod face that is either is without an optical coating or is coated in a way that is optimized for a quartz-polymer interface. By allowing the face to purposely wet to an uncoated rod, the losses associated with an interface are eliminated, thereby increasing the optical efficiency of the system. FIG. 6f shows such positioning of a light pipe 52a and rod 72a, which contact each other at interface 110. With such positioning of light pipe and rod, however, the ability to easily remove a light pipe without damage to the light pipe is absent.

Figure 7A:
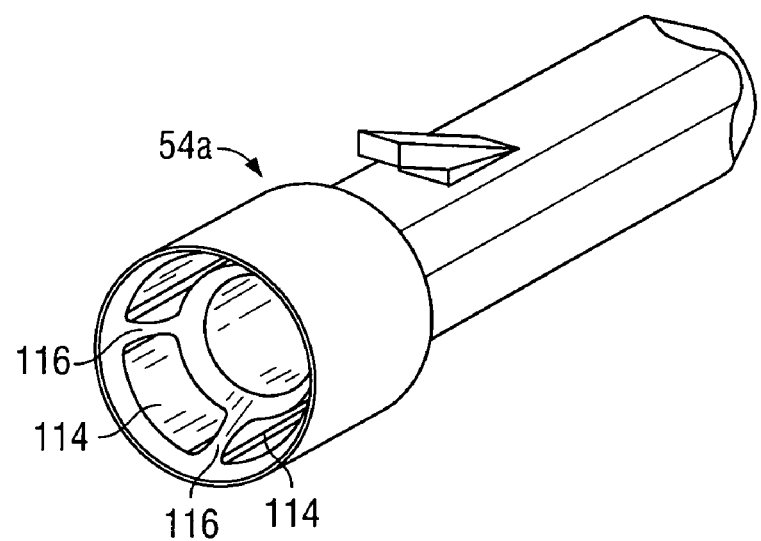
FIG. 7a is an aft perspective view of a plug made of plastic that may be used in the hub arrangement of the invention.

FIG. 7a shows a walled cavity 114 on the aft end of plastic plug 54a, which preferably is segmented by axisymetrically spaced walls 116. Cavity 114 of plastic plug 54a serves at least three purposes. First, inclusion of cavity 114 aids in manufacturing the plug by reducing the time it takes to mold a plastic part, reduces the material required for molding, and improves reproducibility from part to part when spaced walls are included. Also the cavity 114 allows various devices (not shown) to be directly or indirectly mounted into the cavity.

Figure 7B:
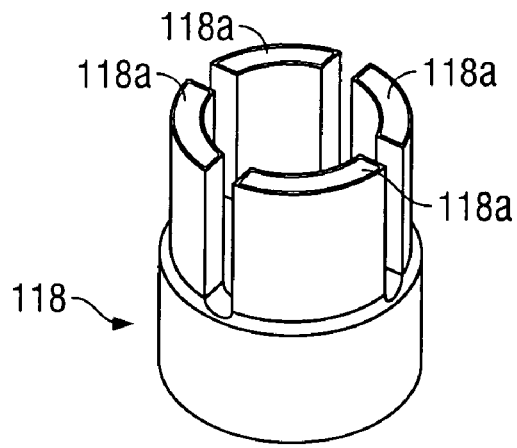

FIG. 7b shows an adapter 118 that may mount into walled cavity 114 of FIG. 7a, so as to allow other devices (not shown) to be mounted to the plug indirectly, via the adapter. Segmented portions 118a of adapter 118 fit into corresponding segments of cavity 114 if such cavity is indeed segmented. Adapter 118 can be installed into walled cavity 114 with either glue or mechanical means such as a set screw. Or, walled cavity 114 can be threaded for receiving adapter 118 if walls 116 are absent.

Figure 8:
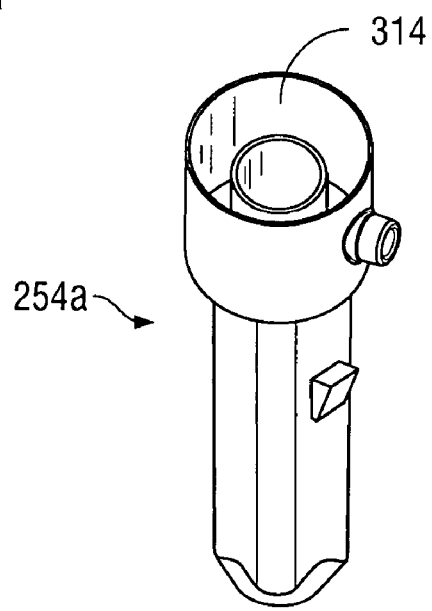
FIG. 8 is a top perspective view of a plug made of metal that may be used in the hub arrangement of the invention.

As an alternative to plug 54a made of plastic, FIG. 8 shows a plug 254a made of metal such as zinc, which has been previously shown in FIG. 6e. Plug 254a has a walled cavity 314 for receiving various devices that may provide strain relief, etc., for an associated light pipe.

Figure 9A:
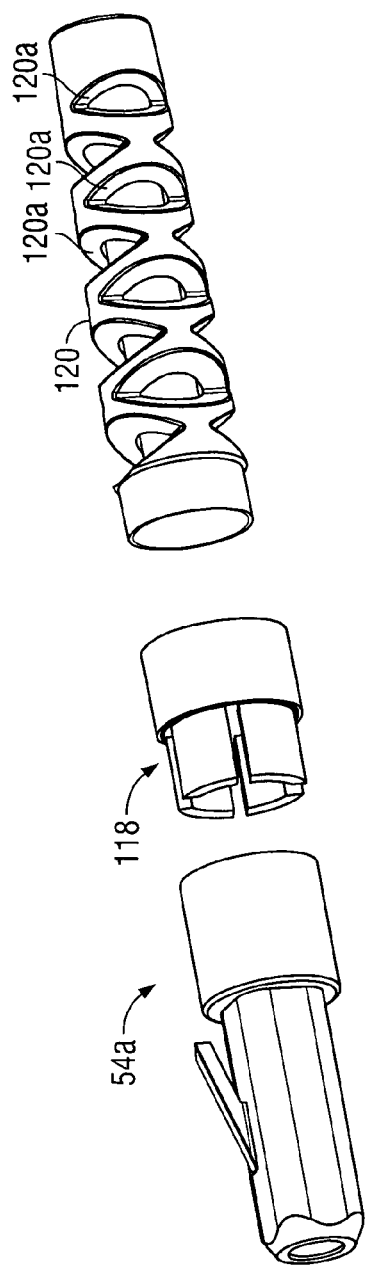
FIG. 9a is an exploded side perspective view of the plug of FIG. 7a and adapter of FIG. 7b together with a strain-relief device.
Figure 9B:
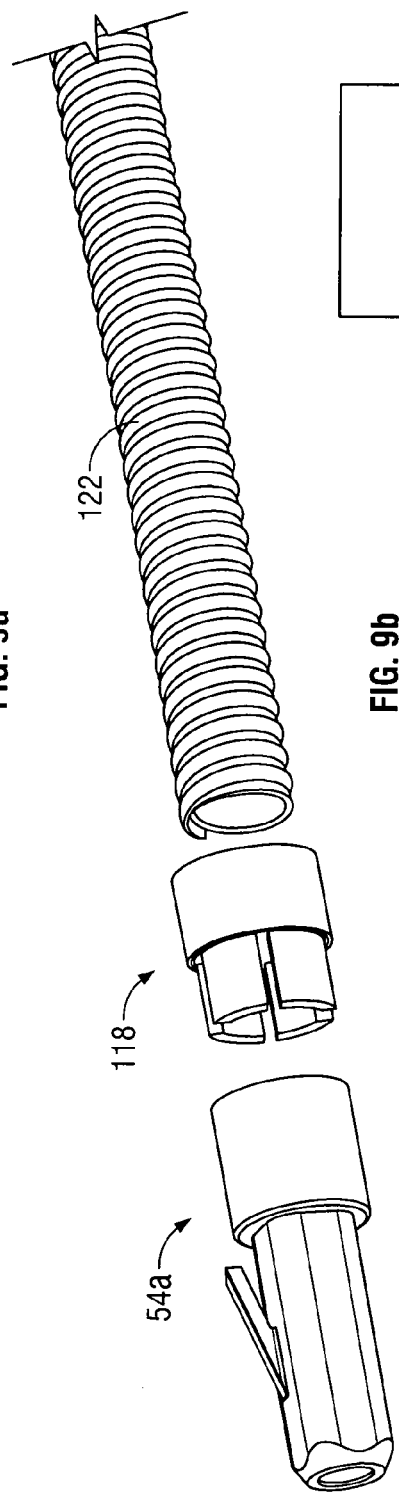
FIG. 9b is similar to FIG. 9a, but shows a different strain-relief device that performs other functions as well.

FIGS. 9a and 9b show adapter 118 between plug 54a and devices 120 or 122 that can be indirectly mounted to the plug by the adapter.

Device 120 (FIG. 9a) is a strain-relief device, typically made of rubber with some cuts in it as shown, and is typically about 20 cm long. It can be made of a rubber tube with various cuts 120a made in the tube. This device 120 can help prevent the light pipe from kinking, or may aid in obtaining a suitable plenum rating for an application.

Device 122 (FIG. 9b) is a flexible, metal conduit that can beneficially cover much or all of the length of otherwise exposed light pipe (not shown). In addition to providing strain relief to a light pipe, it also serves to retard burning of the light pipe, as well as limiting the fiber's bend radius during routing and installation to prevent kinking.

Devices 120 and 122 (FIGS. 9a-9b) can be attached to adapter 118 with means (not shown) such as glue or a mechanical means such as a set screw. If needed, a compression fitting (not shown) could be installed in walled cavity 114 (FIG. 7a), either with or without the adapter, to either hold in place devices 120 or 122, for instance, or to even hold a light pipe in place. This would be useful in a situation where a bundle of small-core plastic light pipes or a glass light pipe is being used, in which event the light pipe can withstand typical compressive forces.

Figure 9C:
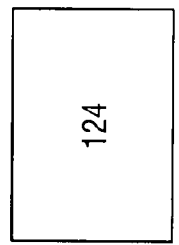
FIG. 9c is a block diagram of a protective device that can be used instead of the devices shown in FIGS. 9a and 9b, for instance.

FIG. 9c schematically shows a device 124 that can be used instead of devices 120 and 122 of FIGS. 9a and 9b. It may comprise plastic or rubber which is co-extruded over the light pipe, and which is fire retardant as being self-extinguishing in the event it catches fire. Alternatively, device 124 may be a watertight conduit, such as a polymer jacket. Having such a watertight covering will prevent a light pipe core from absorbing water and losing its capacity to "pipe" light to possibly a substantial degree by becoming opaque.

FIGS. 9d and 9e show the connection of strain relief device 220, similar to device 120 of FIG. 9a, directly to a metal plug 254a; that is, without the need for an intermediate adapter 118 such as shown in FIG. 9a. Thus, fore portion 220b of device 220 fits within walled cavity 314 (FIG. 8) of metal plug 254a, and can be held in place by a set screw 255.

Figure 9F:
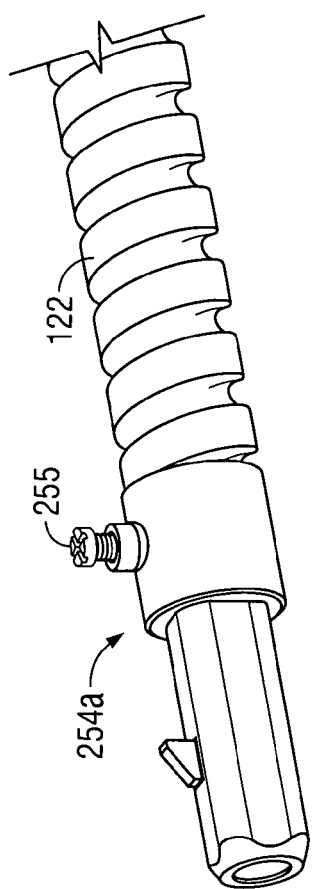
FIG. 9f is similar to 9b, but shows, among other things, a metal plug instead of a plastic plug.
Figure 9G:
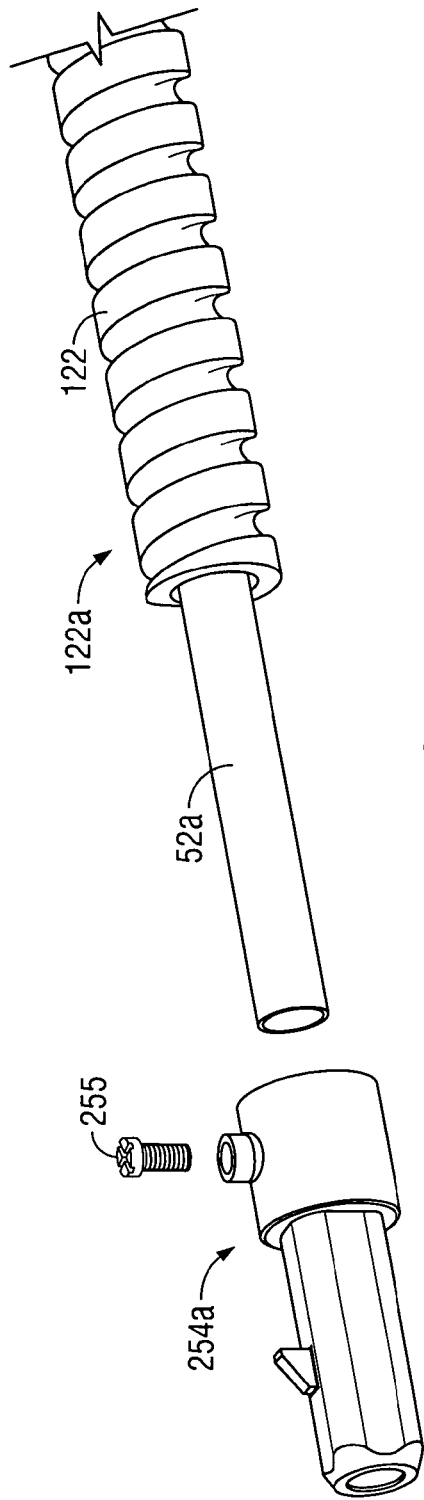
FIG. 9g is an exploded view of FIG. 9f.

FIGS. 9f and 9g show the connection of strain-relief device 122 (e.g., FIG. 9b) directly to metal plug 254a; that is, without the need for an intermediate adapter 118 such as shown in FIG. 9b. Thus, fore portion 120b of device 120, labeled 122a, fits within walled cavity 314 (FIG. 8) of metal plug 254a, and can be held in place by a set screw 255.

Socket and Plug Features

A preferred feature of the invention relates to a safety feature to help prevent premature failure of light pipes. As will be described in more detail below in connection with FIGS. 10a-10d, the inter-fitting surfaces of plug and socket are configured to prevent the occurrence of unwanted combinations of sizes of light-collection rod and light pipe that could cause premature failure of a light pipe.

Figure 10A:
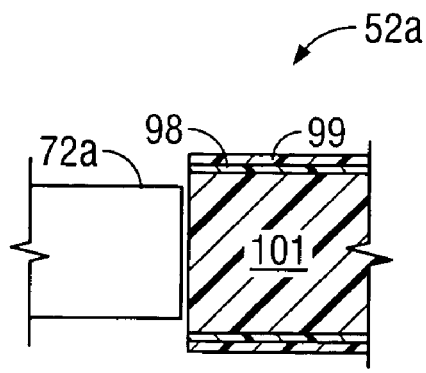
FIG. 10a is a side view of a light-collection rod and adjacent light pipe, partially in cross section.

Typical plastic optical light pipes of acrylic polymer, for instance, are susceptible to failure when over-heated. Minimizing the amount heat in the form of light energy being absorbed into a fluoropolymer cladding 98 as shown in FIG. 10a, or into jacket 99, as shown in FIG. 10a, and into the surrounding portions of an associated plug and light pipe socket, are highly important.

A preferred configuration of the hub arrangement of FIGS. 4 and 5a-5c includes light-collection rods 72a-72d of 10 mm in diameter. To keep the light pipes cool, the light pipes should collect substantially all of the light transmitted by the light-collection rods. This can be accomplished by using light pipes 52a-52d with a core diameter that is at least slightly larger than the diameter of the rods (e.g., 10.3 mm). Such an arrangement is shown in FIG. 10a, in which a light-collection rod 72a is smaller than core 101 of light pipe 52a.

Persons installing a hub arrangement ("installers") using the foregoing dimensions of rod and light pipe core would be able to assure that the desired relation exists if they are not exposed to hub arrangements with other dimensions. But, typically installers will also install other hub arrangements in which, for instance, the rod has a diameter of 11.5 mm and the light pipe cores have a (slightly larger) diameter of 11.7 mm. Typically, installers will carry in their vehicles rolls of light pipe of different core diameters, such as the mentioned 10.3 mm and 1.7 mm diameters. If an installer runs out of the larger (e.g., 11.7 mm-core) light pipe, the installer may seek to use instead the smaller (e.g., 10.3 mm-core) light pipe. In such event, the desired dimensional relation between rod and light pipe core of FIG. 10a is not met, since the installer will attempt to use a light pipe with a 10.3 mm core to receive light from a 11.5 mm rod. This would cause a substantial amount of light from the rod to miss the light pipe core, heat up the light pipe cladding and jacket and adjacent plug, and so shorten the life of the light pipe, perhaps dramatically.

Figure 10B:
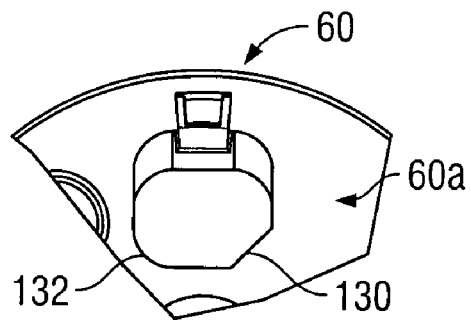
FIGS. 10b and 10c are fragmentary aft views of the geometry of sockets of a different light pipe hubs.
Figure 10E:
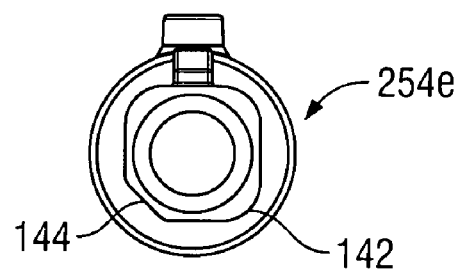
FIG. 10d and 10e are fore views of different plugs that fit into one or both of the sockets shown in FIGS. 10b and 10c.
Figure 10C:
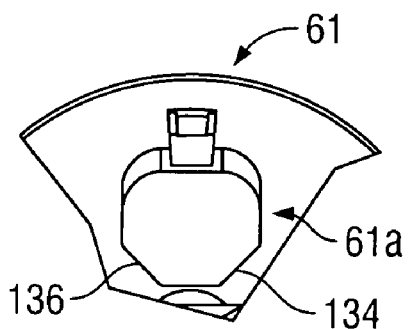

One way to prevent the unwanted dimensioning between rod and light pipe core is to shape the plugs and as shown in FIGS. 10b-10e to prevent unwanted rod-light pipe mismatches. In more detail, for a relatively small rod (e.g., 10 mm), hub 60 of FIG. 10b has a socket 60a having a flat, angled section 130 and a rounded section 132. For a relatively large rod (e.g., 11.5 mm), FIG. 10c shows a hub 61 having a socket 61a with a flat, angled section 134 and another flat, angled section 136.

Figure 10D:
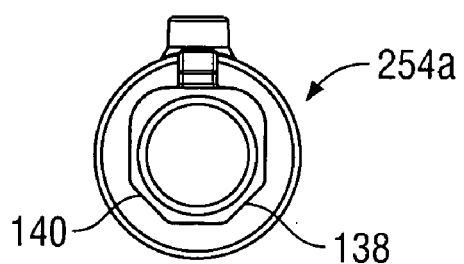

FIG. 10d shows safe plug 54e for a light pipe with a relatively large core (e.g., 11.7 mm) that an installer can use for either hub 60 (FIG. 10b) or hub 61 (FIG. 10c). Thus, plug 54e has a flat, angled section 138 an another flat, angled section 140. Angled section 138 can fit past into either rounded section 132 of hub 60 (FIG. 10b) or angled section 136 of hub 61 (FIG. 10c). Since plug 54e accommodates a relatively large diameter core light pipe, it can safely used by an installer on either hub.

In contrast, plug 54a of FIG. 10e, with a relatively small (e.g., 10.3 mm) core light pipe, which is in danger of destruction if coupled to a larger rod, can fit only into rod 60 (FIG. 10b), with the relatively smaller (e.g., 10 mm) rod. This is because rounded section 142 of plug 54a requires the additional space in the socket provided by rounded section 132 of hub 60 (FIG. 10b). Rounded section 142 will not fit into socket 61a of hub 61 (FIG. 10c), because it cannot fit past flat, angled section 136 of socket 61a.

The foregoing arrangement prevents failure of the light pipe with a relatively smaller core.

Thermal Considerations for Material of Plug and Light Plug Socket

Selection of suitable material for a plug and light pipe socket of the invention involves considerations different from selection of suitable materials for the prior art light pipe hub of FIGS. 1a and 1b, for instance. FIG. 11 schematically shows how four light pipes 12 from the prior art hub of FIGS. 1a and 1b are juxtaposed with a single light-collection rod 150. Rod 150 cannot cover interstitial region 152 between adjacent light pipes 12. As a result, in this prior art arrangement, light energy from the rod impinges on interstitial region 152. The prior art teaches two solutions, one involving a hub made of plastic and the other involving a hub made of metal.

If the prior art hub material is plastic, such light energy in interstitial region 152 is absorbed by the plastic, which acts as an insulator, and needlessly heats the four light pipes. A partial prior art solution is to counter-bore a hole (not shown) into light pipe hub 10 (FIGS. 1a and 1b) to try to prevent light energy from being absorbed into end cap 10b. This has limited success because the light energy is then deposited directly onto exposed light pipe sheathing and cladding (e.g., 98 and 98, FIG. 10a) within the bore, some small distance back from the faces of the light pipes.

A second prior art solution is to make hub 10 (FIGS. 1a-1b) of metal. In such case, some light energy is reflected from the hub back to the rod. The metal hub also acts as a large heat sink for any light energy that is absorbed.

The inventive hub arrangement of FIGS. 4 and 5a-5c, for instance, involves different thermal considerations. In the inventive arrangement, substantially all of the light exiting each light-collection rod is collected by the light-transmitting portion (e.g., core) of a light pipe. As such, very little light from a rod is deposited into the surrounding area of the light pipe hub, so there is no need for the light pipe hub and cooperating plugs to act as a large heat sink. In fact, referring to FIG. 5a, if light pipe hub 60, rod hub 70, and plugs 60a-60d are all made of metal, the temperature of the light pipes may increase, because then the foregoing metal components thermally couple the light pipes to receive the heat generated by a lamp (not shown) that supplies light to the light-collection rods, and also by the ballast for the lamp.

Thus, by using plastic for each of light pipe hub 60 and rod hub 70 of FIG. 5b, the light pipes are insulated from the heat generated by the lamp and ballast and their temperatures are kept within an acceptable operating range. If additional cooling of the light pipes is needed, then plugs can be made of metal to act as heat sinks for the light pipes. In this regard, the aft ends of the plugs can be designed to increase available surface area for dissipating heat from the light pipes.

Installation of Light-Collection Rods into Rod Hub

FIGS. 12a-12b show an aspect of a preferred arrangement for mounting light-collection rods to a backer plate 76, which, in turn, is mounted to rod hub 70 of FIGS. 4 and 5a-5c, for instance. As shown in FIGS. 12a-12b, each rod passes through a respective aperture 159a, 159c, for instance, in backer plate 76. An O-ring 160c is wrapped around rod 72c, for instance, and will be partially received within a groove 162c on the aft side of backer plate 76. The other rods are similarly held in place in the same way with O-rings, which typically provide a watertight seal. FIGS. 13a-13d show a jig 170 that may be used for a preferred procedure for mounting rods 72a-72d in rod hub 70 or FIGS. 4 and 5a-5c.

Figure 13A:
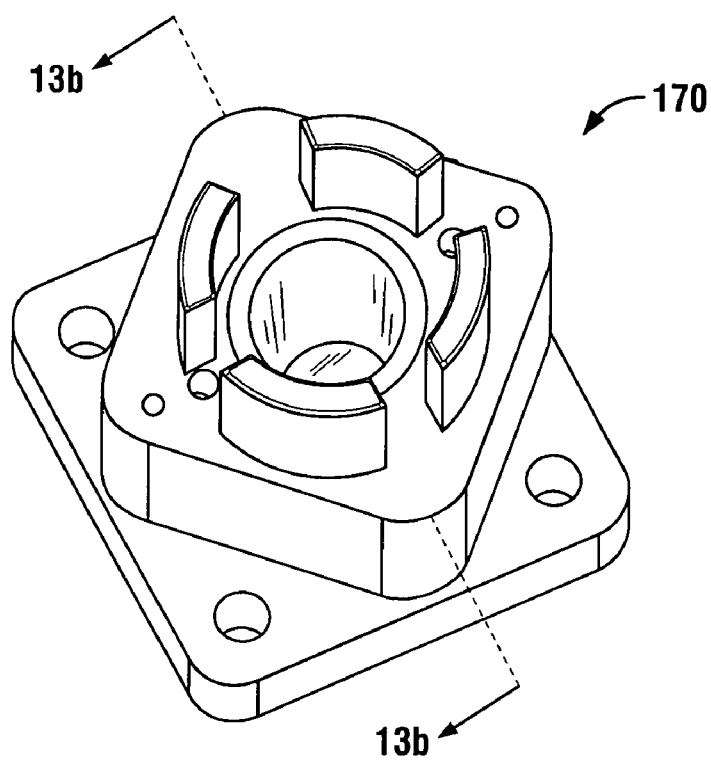
FIG. 13a is a top perspective view of a jig for positioning light-collection rods in the rod hub of FIG. 4.
Figure 13B:
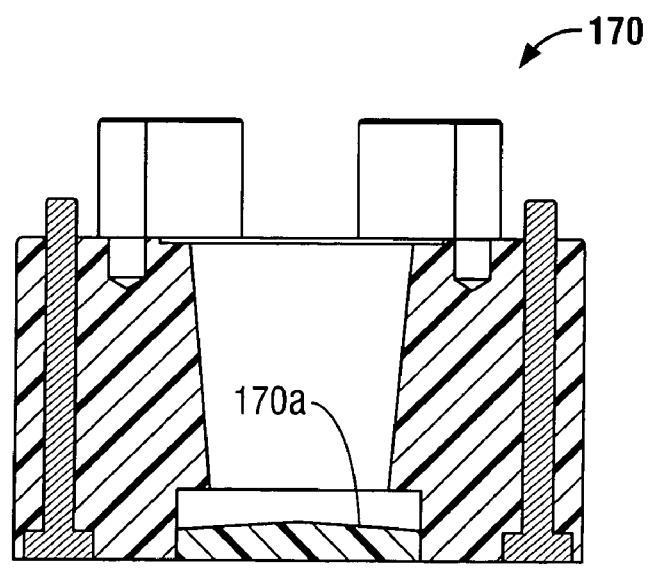
Figure 13C:
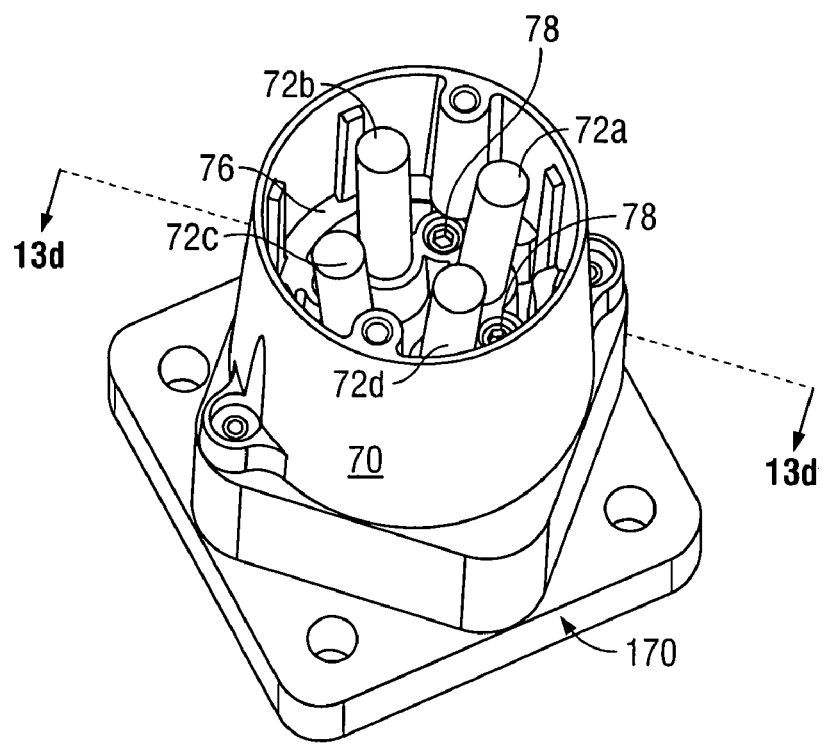
Figure 13D:
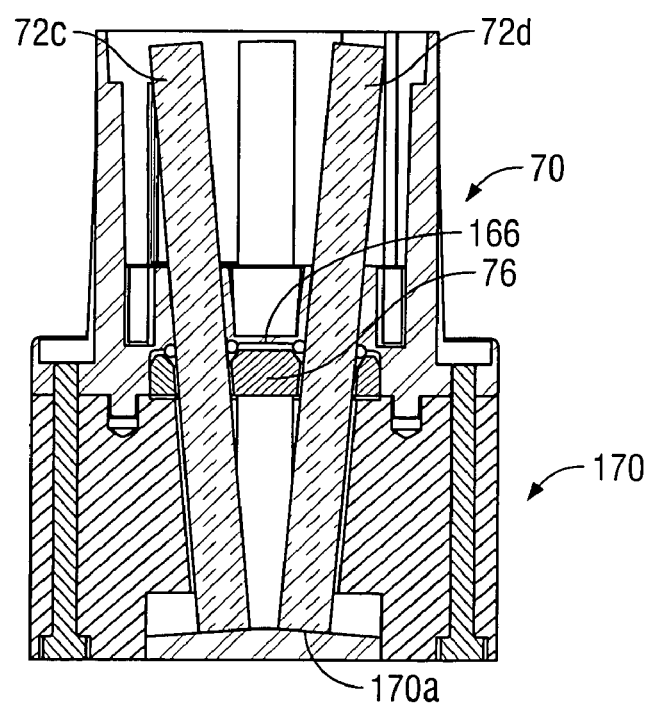
FIG. 13d is a cross section taken at Arrows 13d-13d in FIG. 13c.

FIG. 13a shows an assembly jig 170 of Teflon-brand plastic, for example, used to properly position light-collection rods within a rod hub, and FIG. 12b shows parts of a rod hub being held by the assembly jig 170. In a preferred assembly procedure, an O-ring is fitted snugly around each rod 72a-72d, and the four rods are then inserted into the aft end of rod hub 70. When all four rods with surrounding O-rings are in the rod hub, backer plate 76 is slipped over fore ends of the rods and into place adjacent a receiving surface 166 (FIG. 13d) of the rod hub, labeled 166 in FIG. 5c. The rod hub is then placebd in to jig 170 in such a manner that the fore ends of the rods face downwardly, into the bottom of the jig, towards a stop surface 170a (FIG. 13d). This assures the correct location of the fore faces of each rod. Each of the rods is pushed down until it reaches its respective limit on stop surface 170a (FIG. 3d) within the jig. Once all the rods are in their correct position, four screws 78 (FIGS. 5a and 13c), for instance, which hold the backer plate to the rod hub, are tightened to pull the plate up into a seat adjacent surface 166 (FIG. 13d) of the hub. This action compresses each O-ring into respective grooves (e.g., 162c, FIG. 12b), which locks each rod into place.

The foregoing rod-mounting arrangement is unique in that it aligns the rods correctly, and allows the backer plate to be attached from the fore end of the rod hub while the rods are held in the correct location. Beneficially, the O-rings provide a watertight seal between rod and backer plate. Additionally, by adding a gasket (not shown) between the fore end of the rod hub and an illuminator, a completely watertight rod hub and illuminator can be produced if needed.

Releasable Connection of Plug to Socket

Figure 14:
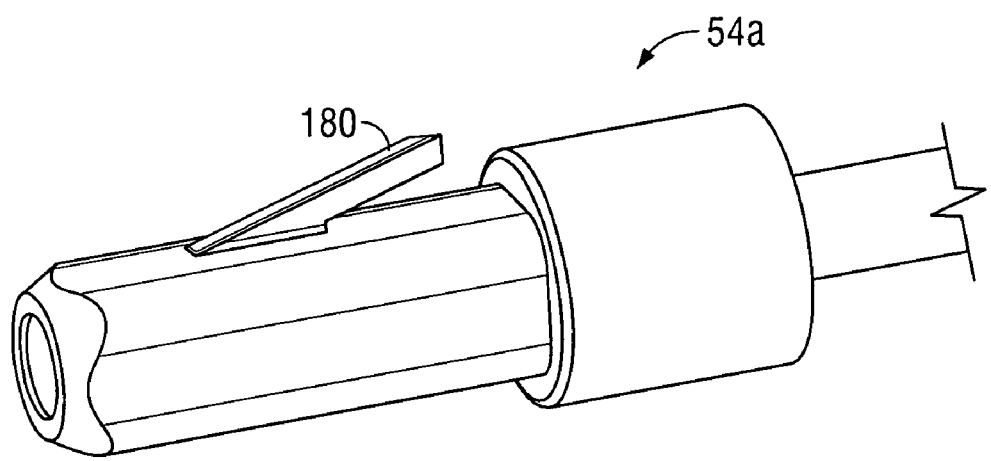
FIG. 14 is a fore, perspective view of a plug with a flexible latch used in the hub arrangement of FIG. 4.

Various means can be employed to connect a plug into the socket of a light pipe hub. Preferably, this is done in a releasable manner. As shown in FIGS. 5c and 14, representative plug 54a incorporates a flexible latch 180 for being received with a walled cavity adjacent socket 60a of the light pipe hub, such as the walled cavity shown at 182 in FIG. 5c. During installation of plastic plug 54a into a socket, flexible latch 180 is flexed away from the side of the plug. When the plug starts to be inserted into a socket, the flexible latch 180 flexes toward the side of the plug. When the plug is inserted far enough into the socket, the flexible latch will make a "click" sound as it snaps into the walled cavity and locks the plug in place. This "click" sound gives the installer positive audio feedback as to when the plug is properly installed.

Because the light pipe is mounted in the plug in a predetermined location, the fore face of the light pipe is then held in the correct location relative to a light-collection rod, such as shown in FIG. 5a, for maximizing light collection. Also, by controlling the location of the light pipe face, the light pipe can, if desired, be prevented from coming into contact with the rod. As mentioned above, this prevents the light pipe from wetting to the rod, with loss of optical performance. In this way, the light pipe can be easily removed at any time. When the plug is to be removed from the light pipe hub, simple mechanical means such as a screwdriver, a coin such as a dime, or even a thumbnail can be used to dislodge the flexible latch (e.g., 180, FIG. 14), until it disengages from the walled cavity, allowing the plug to be pulled out of the socket.

Figure 15A:
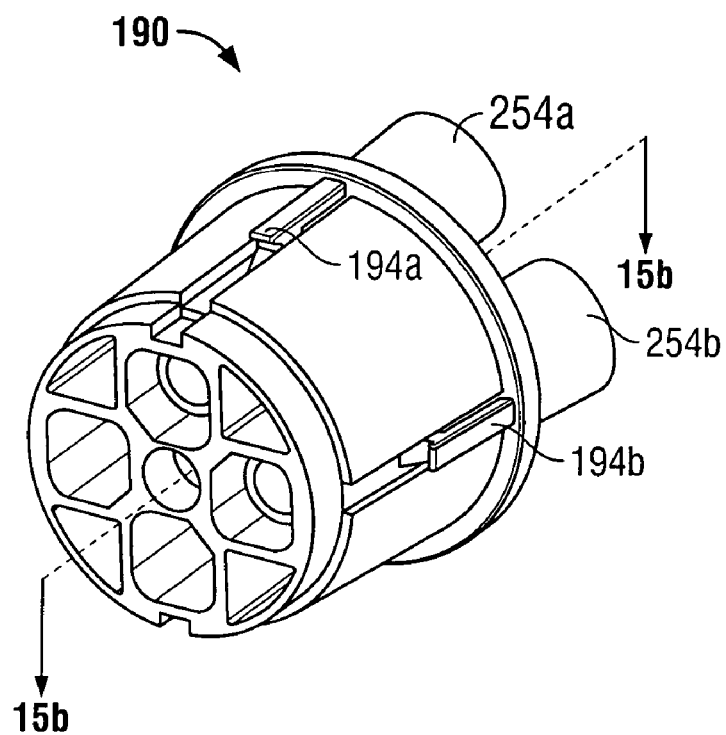
FIG. 15a is a fore perspective view of a light pipe hub with alternative means for mounting plugs, two of which are shown.
Figure 15B:
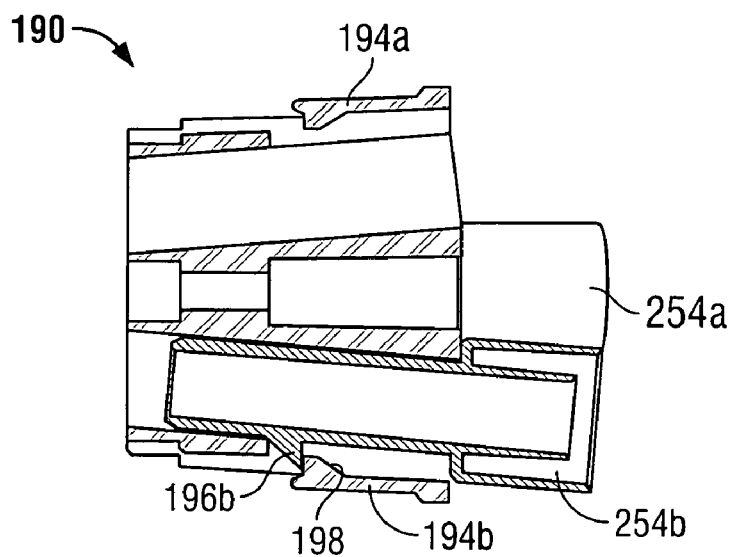

However, the flexible latch (e.g., 180, FIG. 14) does not need to be located on the plug. If the plug is made of metal for thermal heat sink purposes, for instance, the flexible latch can be incorporated into a plastic light pipe hub. Thus, as shown in FIG. 15*a*, a light pipe hub 190, in which two plugs 254*a* and 254*b* are mounted, incorporates flexible latches 194*a* and 194*b*, for instance. As shown in FIG. 15*b*, upon insertion of metal plug 254*b* into light pipe hub 190, from right to left, a catch 196*b* will initially press against enlarged portion 198 of latch 194*b* to flex latch 194 downwardly. After catch 196*b* passes to the left of enlarged portion 198, flexible latch 194*b* snaps upwardly, into the position shown, to lock the plug into the light pipe hub.

Alternative Hub Arrangements

Alternatively, if both the light pipe hub and the plugs are made of a material with little flex, such as metal, then other mechanical means can releasably hold the plugs into the light pipe hub. Such means may be a setscrew or ball plunger, by way of example.

The hub arrangement of the present invention is not limited to use with multiple light-collection rods. An alternate rod hub (not shown) could hold a single, large light-collection rod, and cooperate with a light pipe hub to locate the fore face of each light pipe in the correct location with respect to the rod. If it is difficult to bring each light pipe face tangent to each other and in the correct location using separate plugs for each individual light pipe, then the light pipe hub can receive a single plug that holds each light pipe of a bundle in the correct location.

Further, the hub arrangement of the invention can omit a rod hub in the event it is used with an illuminator not requiring rods for thermal-isolating purposes, for instance. As long as sufficient ultraviolet (UV) and infrared (IR) protection are provided for the light pipe, then a light pipe hub can be attached directly to an illuminator which holds the plugs and light pipe fore (or input) faces in the correct location within the illuminator. Such a rodless arrangement would most likely be used with traditional fiberoptic illuminators using an imaging reflector and separate filters.

Figure 16A:
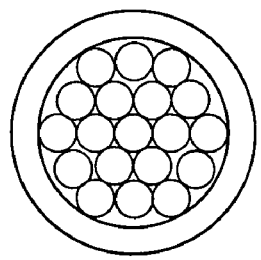
FIGS. 16a and 16b are simplified, cross-sectional views of different configurations of light pipe that may be accommodated by the hub arrangement of the invention, without cross-hatching for ease of illustration.
Figure 16B:
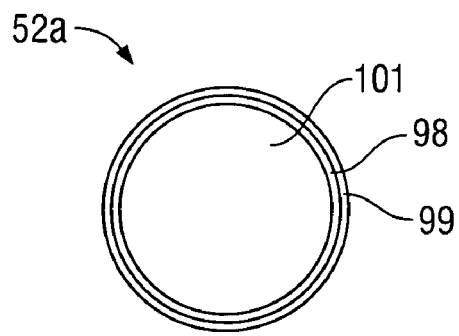

Further, the hub arrangement of the invention is not limited to use with large-core light pipes, such as shown in FIG. 16*a*. Rather, multi-stranded small-core plastic optical light pipe, such as shown in FIG. 16*b* and typically made of poly-methyl methacrylate (PMMA) can be used. The hub arrangement also can accommodate any other type of solid or hollow, plastic or glass light pipe or light guides. The light pipes or guides can be either optimized to provide end-light, to provide side-light or to provide a combination of both end-light and side-light.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. A hub arrangement for mounting light pipe to receive light, comprising:
   a) a rod hub for mounting a plurality of thermally isolating, light-collection rods of refractory material for receiving light from a high-temperature light source through a non-imaging collector; the rod hub arranging light-receiving ends of said light-collection rods in a manner such that each of the light-receiving ends receives light from said light source; and
   b) a light pipe hub for mounting a plurality of light pipes with a plug-and-socket arrangement; the plug-and-socket arrangement including:
      i) a plurality of sockets in the light pipe hub for receiving a plurality of plugs;
         each of the plurality of sockets receiving an associated one of said plugs:
      ii) said plurality of plugs mounting said plurality of light pipes; each of the plurality of light pipes being mounted in an associated one of said plugs;
      iii) said plurality of light pipes receiving light from said plurality of rods; each of said plurality of light pipes receiving light from an associated one of said rods;
      iv) each of said plurality of plugs comprising:
         (1) a fore end being received in an associated one of said sockets;
         (2) a channel for receiving an associated one of said light pipes through an aft end.

2. The hub arrangement of claim 1, wherein the plug is arranged to position the light pipe in a predetermined axial location within the plug.

3. The hub arrangement of claim 1, wherein the rod hub and the light pipe hub are so arranged as to cause the confronting faces of the light pipe end and the light-collection rod to be sufficiently close to each other that faces wet themselves to each other so as to form singular interface between the two faces.

4. The hub arrangement of claim 1, wherein inter-fitting surfaces of the socket and plug are shaped non-cylindrically to prevent insertion of the plug unless the confronting faces of the light-collection rod and the light pipe are so arranged that the light-carrying portion of the light pipe receives substantially all the light emitted by the rod.

5. The hub arrangement of claim 4, wherein the socket can receive a plug holding a light pipe with a light-carrying portion of a first size and a plug holding a light pipe with a light-carrying portion of a larger size.

6. The hub arrangement of claim 1, wherein:
   a) the rob hub includes a plate;
   b) the plate comprises:
      i) a first main surface and a second main surface;
      ii) an aperture between the first and the second surface; the rod passing through the aperture; and
   c) the plate mounting the rod to the hub.

7. The hub arrangement of claim 6, wherein the plate has a groove contoured for receiving an O-ring for being compressed against the rod when the plate is secured into the rod hub.

8. The hub arrangement of claim 6, wherein the plate is removable from the rod hub.

9. The hub arrangement of claim 6, wherein the rod hub includes a compressible gasket for holding the rod.

10. The hub arrangement of claim 1, wherein the light pipe hub is made of plastic.

11. The hub arrangement of claim 10, wherein the plug is made of metal.

12. The hub arrangement of claim 1, wherein the aft end of the plug has a walled cavity facing away from the light pipe hub for mounting a device for protecting the light pipe.

13. The hub arrangement of claim 12, wherein the device is a strain-relief device for relieving strain on the light pipe.

14. The hub arrangement of claim 12, wherein the device is a flexible metal conduit for receiving the light pipe.

15. The hub arrangement of claim 12, wherein the plug has a flexible latch for being received within a walled cavity of the socket for locking the plug into the socket in axial predetermined location.

16. The hub arrangement of claim 12, wherein the socket has a flexible latch for being received within a walled cavity of the plug for locking the socket to the plug in a predetermined relation.

17. The hub arrangement of claim 12, wherein the device is a flexible metal conduit for receiving the light pipe.

18. The hub arrangement of claim 17, wherein the metal conduit is directly mounted in cavity.

19. The hub arrangement of claim 12, wherein the device is a watertight covering to protect the light pipe.

20. The hub arrangement of claim 12, wherein the device is fire-retardant material to protect the light pipe.

21. The hub arrangement of claim 1, wherein the light pipe is held in the plug with the aid of glue.

22. The hub arrangement of claim 21, wherein the glue is cyanoacrylate-based glue or epoxy.

23. The hub arrangement of claim 1, wherein the channel of the plug has a stop to locate the light pipe in a predetermined axial location with the plug.

24. The hub arrangement of claim 1, wherein the fore end of the plug is integrally joined to the aft end of the plug.

25. The hub arrangement of claim 24, wherein a continuous interior channel in the plug for receiving the light pipe has an increasing diameter from the fore end to the aft end of the plug.

26. The hub arrangement of claim 25, wherein:
a) that portion of the light pipe mounted within the plug has a longitudinal axis; and
b) said portion of the light pipe is held within the plug with the aid of radial compression with respect to said longitudinal axis.

27. The hub arrangement of claim 26, wherein said portion of the light pipe is fixed in relation to the fore end and the aft end of the plug.

28. The hub arrangement of claim 1, wherein each plug and associated socket include a latch arrangement to releasably hold the plug with the socket.

29. The hub arrangement of claim 1, wherein the rob hub arranges light-receiving ends of said light-collection rods in a manner such that each of the light-receiving ends receive light rays traveling from said light source in respective straight lines.

30. A hub arrangement for mounting light pipe to receive light, comprising:
a) a rod hub for mounting at least one thermally isolating, light-collection rod for receiving light from a light source; the rod hub including a plate with an aperture for receiving the rod and mounting the rod to the hub; and the plate having a groove contoured for receiving an O-ring for being compressed against the rod when the plate is secured into the rod hub;
b) a light pipe hub made of plastic for mounting at least one light pipe, with a plug-and-socket arrangement; the plug-and-socket arrangement including:
i) a socket in the light pipe hub for receiving a plug; and
ii) a plug for mounting a light pipe end that is to receive light; a fore end of the plug being receivable within the socket; the plug having a channel for receiving the light pipe through an aft end of the plug; the plug including an interior channel for receiving the light pipe, the channel having an increasing diameter from the fore end to the aft end of the plug; the channel having a stop to locate the light pipe in a predetermined axial location within the plug; and an aft end of the plug having a generally annular cavity for connecting to a strain-relief device.

31. The arrangement of claim 30, wherein the number of rods and light pipes is three or four.

32. A hub arrangement for mounting light pipe to receive light, comprising:
a) a rod hub for mounting at least one thermally isolating, light-collection rod for receiving light from a light source;
b) a light pipe hub for mounting at least one light pipe, with a plug-and-socket arrangement; the plug-and-socket arrangement including:
i) a socket in the light pipe hub for receiving a plug;
ii) a plug for mounting a light pipe end that is to receive light; a fore end of the plug being receivable within the socket; the plug having a channel for receiving the light pipe through an aft end of the plug;
iii) a latch arrangement to releasably hold the plug in the socket; and
c) the rod hub having a late for mounting the rod to the hub; the plate comprising:
i) a first main surface and a second main surface;
ii) an aperture between the first and the second surface; the rod passing through the aperture; and
iii) a groove contoured for receiving an O-ring for being compressed against the rod when the plate is secured into the rod hub.

* * * * *

UNITED STATES PATENT AND TRADEMARK OFFICE
CERTIFICATE OF CORRECTION

PATENT NO. : 7,334,945 B2
APPLICATION NO. : 10/825985
DATED : February 26, 2008
INVENTOR(S) : Bina et al.

It is certified that error appears in the above-identified patent and that said Letters Patent is hereby corrected as shown below:

Column 1, after line 6 insert:

--GOVERNMENT INTEREST

This invention was made with Government support under Agreement Number DAAH01-03-9-R001 awarded by U.S. Army Aviation and Missile Command. The government has certain rights in the invention.--

Signed and Sealed this

Eighteenth Day of August, 2009

David J. Kappos
*Director of the United States Patent and Trademark Office*